(12) United States Patent
Cipolli

(10) Patent No.: US 7,060,016 B2
(45) Date of Patent: Jun. 13, 2006

(54) DEVICE FOR ROTARY CONVERTING A WEB OR SHEET MATTER

(75) Inventor: Marco Cipolli, Les Monts-de-Pully (CH)

(73) Assignee: Bobst S.A. (CH)

( * ) Notice: Subject to any disclaimer, the term of this patent is extended or adjusted under 35 U.S.C. 154(b) by 0 days.

(21) Appl. No.: 10/350,526

(22) Filed: Jan. 22, 2003

(65) Prior Publication Data

US 2003/0139274 A1    Jul. 24, 2003

(30) Foreign Application Priority Data

Jan. 24, 2002   (CH) ..................... 0115/02

(51) Int. Cl.
 *B31B 1/56*   (2006.01)
(52) U.S. Cl. ............. 493/478; 493/479; 493/235; 493/241
(58) Field of Classification Search ........... 493/478, 493/479, 235, 241; 83/344, 331, 346; 222/102
See application file for complete search history.

(56) References Cited

U.S. PATENT DOCUMENTS

| | | | | |
|---|---|---|---|---|
| 1,783,101 A | * | 11/1930 | Schaefer ..................... 222/102 |
| 2,734,662 A | * | 2/1956 | Shippen ...................... 222/102 |
| 4,455,903 A | * | 6/1984 | Kesten ........................ 83/346 |
| 4,674,377 A | | 6/1987 | Groth ......................... 83/324 |
| 5,058,472 A | * | 10/1991 | Kakko-Chiloff ............ 83/344 |
| 5,118,011 A | * | 6/1992 | Kopp ......................... 222/102 |
| 5,178,302 A | * | 1/1993 | Cheng ........................ 222/102 |
| 5,598,758 A | * | 2/1997 | Chmelar ..................... 83/100 |
| 5,806,418 A | * | 9/1998 | Dillinger ..................... 101/24 |
| 5,842,399 A | | 12/1998 | Pfaff, Jr. .................... 83/343 |
| 5,906,569 A | * | 5/1999 | Ratzel ........................ 493/363 |
| 6,447,436 B1 | * | 9/2002 | Lindsay ...................... 493/216 |

FOREIGN PATENT DOCUMENTS

| | | |
|---|---|---|
| CH | 691116 | 4/2001 |
| EP | 0113601 | 5/1987 |
| EP | 0 271 229 A1 | 6/1988 |
| EP | 0764505 | 11/1999 |
| EP | 1 132 184 A1 | 9/2001 |
| FR | 2556268 | 6/1985 |
| FR | 2695588 | 3/1994 |

OTHER PUBLICATIONS

European Search Report dated Dec. 13, 2004.

\* cited by examiner

*Primary Examiner*—Stephen F. Gerrity
*Assistant Examiner*—Hemant M. Desai
(74) *Attorney, Agent, or Firm*—Ostrolenk, Faber, Gerb & Soffen, LLP

(57) ABSTRACT

A device for rotary conversion of a web or sheet material by cooperating cylindrical tools. The tools are arranged in a cassette. A driving device connects with the tools for rotating them. The cassette with the tools is placed in an adaptive cassette receiver. The driving device includes a motor and is supported on the lid of the cassette receiver. The cassette is placeable in and removable from the cassette receiver and is secured there and the driving device is connected to the tools.

15 Claims, 3 Drawing Sheets

DEVICE FOR ROTARY CONVERTING A WEB OR SHEET MATTER

BACKGROUND OF THE INVENTION

The present invention relates to a device for rotary conversion of a web or sheet matter in a machine mainly manufacturing paper, cardboard or plastic folding box blanks in the packaging industry in particular.

The conversion of a cardboard web into folding box blanks, for example, consists of printing it, of embossing the parts intended to appear in relief, of creasing it where desired and of cutting it while simultaneously stripping undesirable waste resulting from cutting. All these operations are carried out in successive processing stations driven in synchronism which constitute the packaging manufacturing machine.

The invention is mainly of use in the said embossing, creasing and cutting operations. Each operation uses corresponding rotary tools which act successively on the web.

A station for cutting a web by rotary tools, which generally consist of an upper cutting tool and a lower smooth cylindrical anvil, will be taken as an example to describe the arrangement of such stations. The upper tool and the lower anvil, between which the web matter is cut, are mounted in bearing blocks arranged in a cassette disposed between the side frames of the machine processing the web. The bearing blocks are inserted by sliding them in the vertical direction between the inner edges of the cassette which forms the bearing structure of these blocks. The lower and upper rotary tools are driven at the same angular speed but in opposite direction to one another by gears having diameters chosen so as to leave only a short distance between the upper tool and the lower anvil. In order to ensure the interval separating these two tools very precisely (about 1 µm), each end of the upper tool and the lower anvil comprises a bearing crown and a fine control system including adjusting wedges equipped each with a micrometric threading. The bearing blocks of the upper tool are connected with those of the lower anvil by a flexible coupling device and pressed against one another by rods or cylinders allowing to apply the desired cutting pressure while respecting the radial interval between the two rotary tools. Such a device is described more in detail in patent CH691116.

Each machine manufacturer generally has its own system of cassette inserted in each of the embossing, creasing, cutting or even printing stations as described in patent EP0113601. Some manufacturers have the cutting cassette resting on the bottom of the housing where it will be inserted, whereas others have it suspended in its median part of pins which enable it to be fixed at a constant reference level corresponding to the passage plane of the web or the sheets, whatever the diameter of the rotary tools defining the cutting format may be.

Some manufacturers have chosen a system of cassette forming a rigid unit in which the upper cutting tool and the lower anvil have been adjusted as much as possible outside the machine, whereas other manufacturers have less powerful systems, but quite as reliable, requiring adjustments in machine of the position of these two tools, not only to one another but also one and the other with respect to the machine frame. Effectively, in any case the meticulous adjustments of the spacing of the tools, their parallelism and their relative orientation in the horizontal and vertical planes should be carried out to allow a perfect cutting and a minimal wear of the cutting rules. As shown in document FR2556268, it is also known to tighten the tools in their housing, by exerting a constraint on the tools piled up in the cassette between its upper part and the bottom of the housing of the machine frame.

According to various possible embodiments, these stations are driven either all from the same machine side, or alternately from one side then the other. In this last case, the power sources for driving the cylindrical tools of the cassettes are not all on the same machine side. The prior art also shows that the drive systems completely differ according to the system of cassette provided by each manufacturer. Some use an adjustable arm, commonly called swivel arm, allowing to adapt the position of the driving toothed wheel to that of the output pinion of the cassette, the dimension of which each time varies according to the diameter of the cutting tool imposed by the cutting format required by the customer. Other manufacturers solved the engagement problem in another way, either by a specific arrangement of the whole cassette with respect to the machine frame, as shown by the kinematic chain illustrated in patent U.S. Pat. No. 4,674,377, or by a system of independent drive exclusively for the rotary cutting unit as shown in patent FR2695588. This prior art has the motor located on one of the side walls of the cutting unit, at a fixed given height, ensuring the direct drive of one cylindrical tool, whereas the other cylindrical tool must be moved in machine by a system of levers, cylinder and eccentric bearings, in the direction of the first tool so as to be also driven by the toothed wheel of the latter.

The great variety of the drive means and systems of arrangements of cassettes in the converting station renders a tool exchange between machines from different manufacturers completely impossible. Considering the very high manufacturing cost (about Euro 100'000) of a pair of cylindrical tools specifically adapted to convert only one type of packaging box of a certain format, it is thus unreasonable that a tool exchange between machines is not possible. This is particularly disadvantageous for a company or an independent who will change the trademark of machines. The same problem arises for a company willing to increase or partly renew the machine stock by more powerful production lines from another manufacturer. Obviously, with a plurality of machines from different manufacturers, it would be advantageous to be able to use one type of cassette on machines from different manufacturers. However, until now, the converting machines for producing packagings do not allow using a foreign important member, such as a cassette for rotary cutting from a competitive machine.

SUMMARY OF THE INVENTION

The aim of the present invention is to remove the aforesaid disadvantage by proposing a device allowing the exchange of converting tools between machines of the same type but of different trademark. This aim is achieved owning to the arrangement, in each converting station, of an adaptive cassette having an external geometry, or profile, in conformity with that of a cassette for the machine to be used, and an internal geometry in conformity with the profile of the cassette from the machine from where the tools are taken. Obviously, it is provided that the two machines use a priori incompatible cassettes.

Thus, the advantage of this invention is to allow a real exchange of a priori incompatible tools from different manufacturers, to provide a better rationalization of the use of these tools by considerably lowering the capital costs, to guarantee a performance and a quality of work which is at least equal to that carried out by a machine equipped with its original tools, to reduce the time for preparing the machine by using entirely adjusted tools and, therefore, to avoid a significant waste of matter occuring when setting new tools.

BRIEF DESCRIPTION OF THE DRAWINGS

The invention will be more clearly understood from an embodiment given by way of non-limitative example and illustrated by the accompanying drawings, in which.

DESCRIPTION OF A PREFERRED EMBODIMENT

In order to define a few terms commonly employed in the following description to describe the orientation or location of certain components, it should be noted that the terms "longitudinal" and "transversal" always refer to the direction of travel of the web or sheets in the machine and that the terms "upstream" and "downstream" respectively refer to the side nearest the entry and nearest the exit of the machine.

Figure 1:
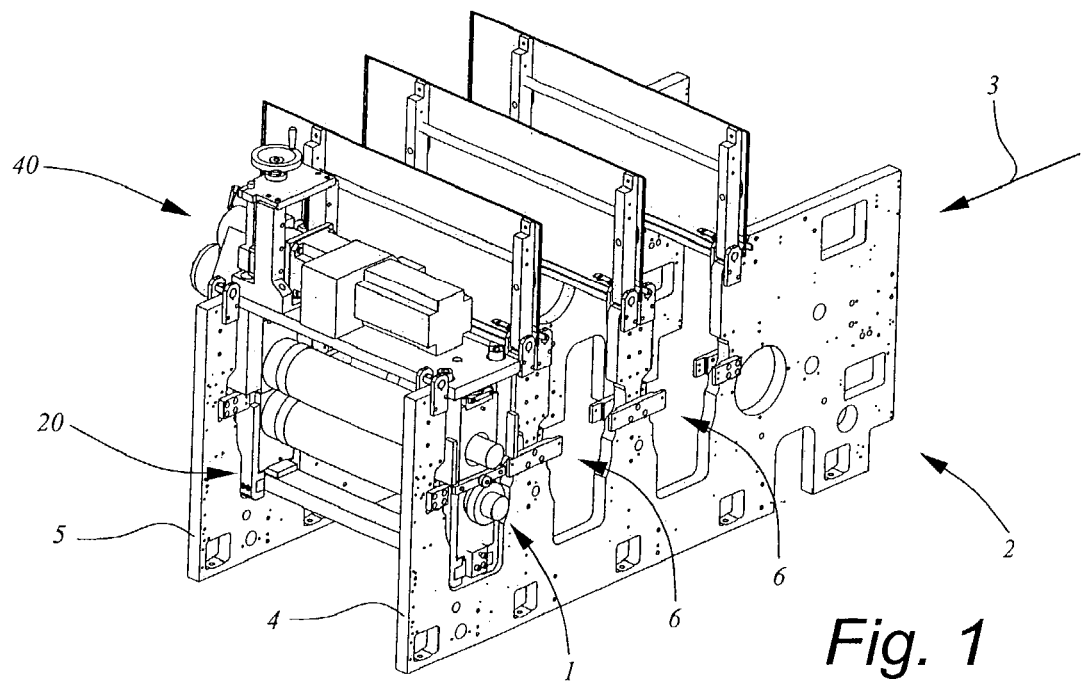
FIG. 1 is a perspective view of the device according to the invention in a conventional machine for converting a web matter in particular.

FIG. 1 is a perspective view of the device 1 of the present invention in a conventional machine 2 for converting a web matter in particular. The travelling direction of the matter (not shown) is from upstream to downstream according to the orientation given by arrow 3. The frame of the machine 2 is formed by two side walls 4 and 5 including wide oblong and vertical openings 6 containing the devices for embossing, creasing and cutting. In FIG. 1, only the last converting device 1 (cutting) is inserted.

Figure 2:
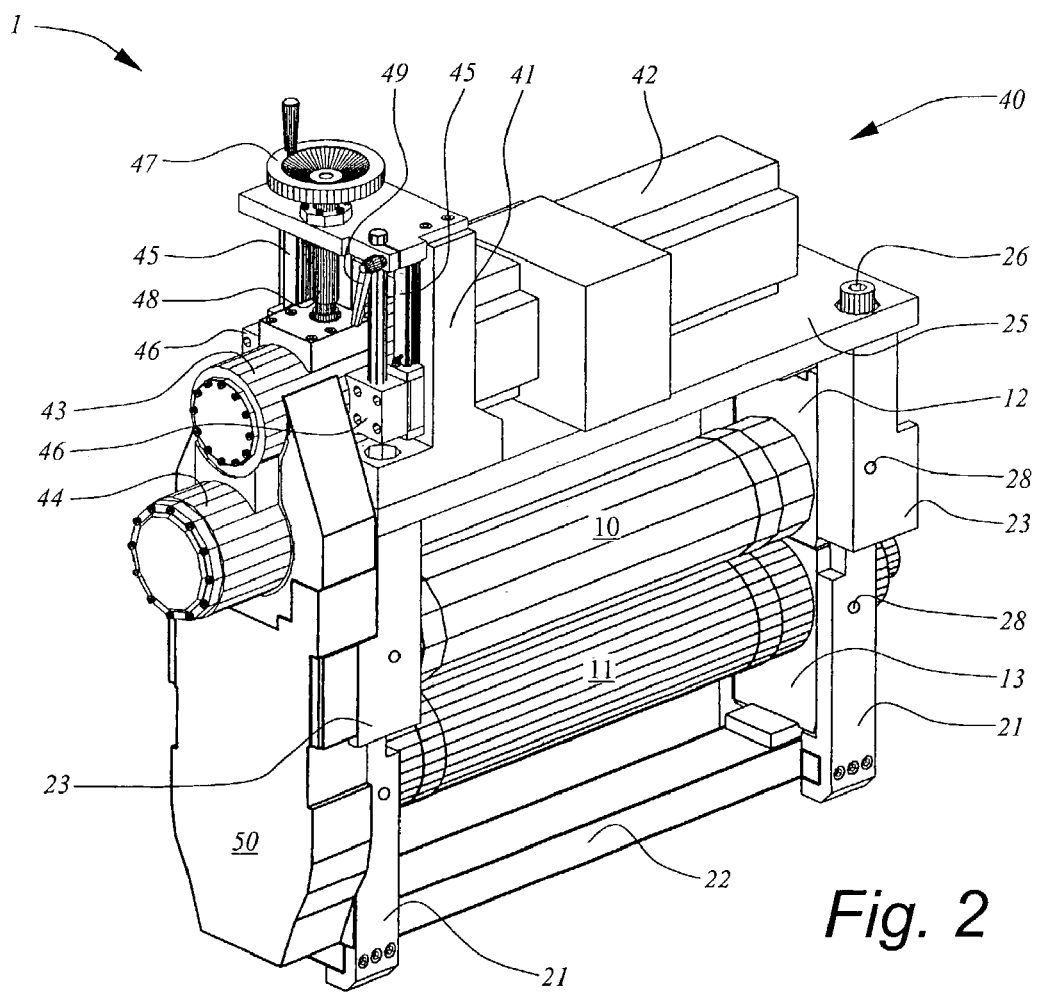
FIG. 2 illustrates the device of the present invention removed from the machine of FIG. 1 and equipped with a pair of ordinary cylindrical tools.
Figure 3:
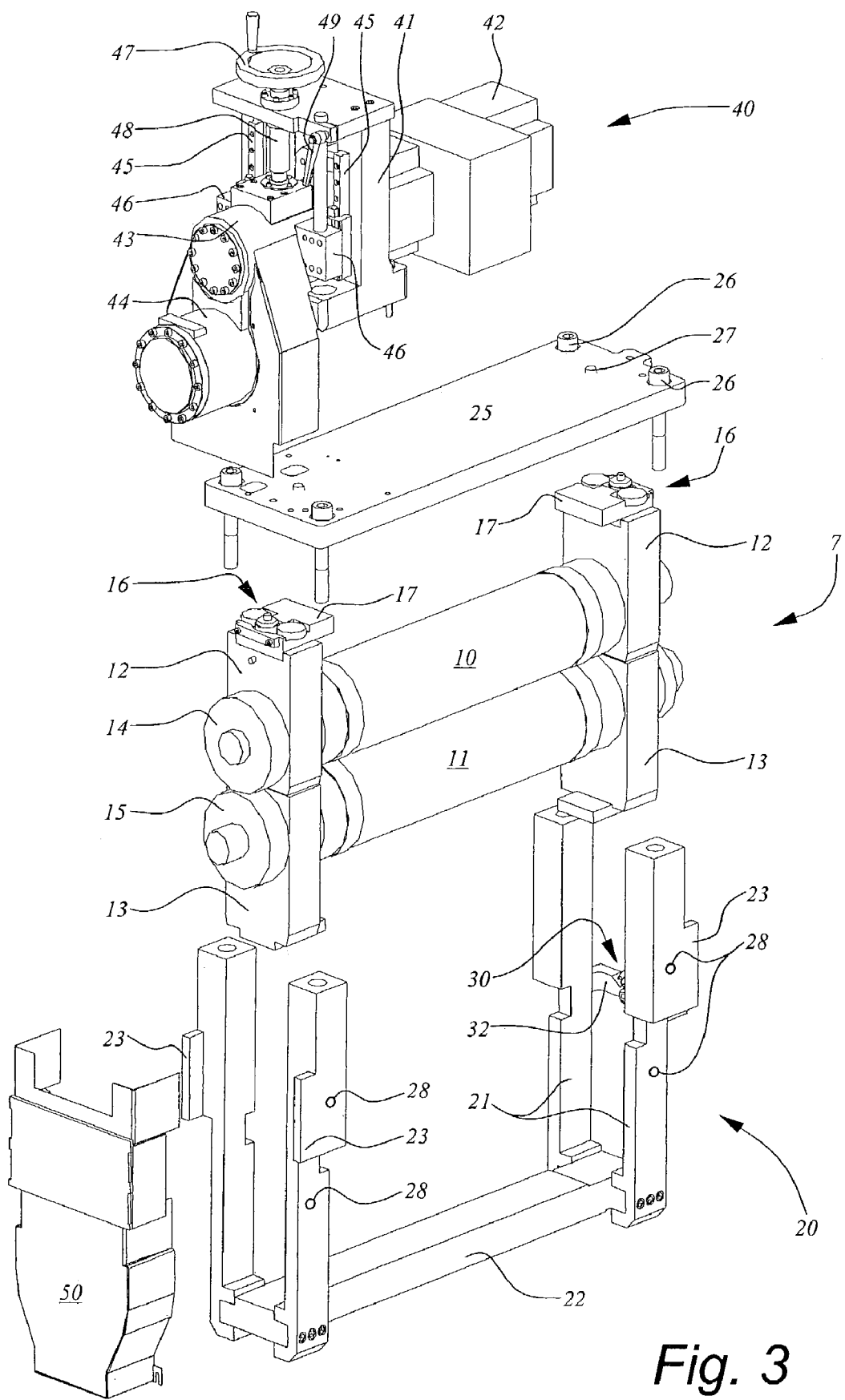
FIG. 3 is an exploded perspective view of the assembly of the main components of the device shown in FIG. 2.

FIGS. 2 and 3 illustrate, separately and in another perspective view, the converting device 1 equipped with an ordinary cassette 7, respectively in assembled and exploded form, showing the principal components of this unit. The cassette 7 is the exchange member between machines for which the converting device 1 has been realized. This cassette consists of an upper cutting tool 10 mounted in a first pair of bearing blocks 12 and of a lower cylindrical anvil 11 mounted in a second pair of bearing blocks 13. The upper cutting tool 10 is rotated at one end by means of a toothed wheel 14 which engages the corresponding toothed wheel 15 of the lower anvil 11. The two pairs of bearing blocks 12 and 13 are firmly kept and pressed against one another by a double flexible coupling device 16, each mounted on a tablet 17 arranged on each higher part of the pair of bearing blocks 12.

In order to enable the exchange of foreign cylindrical tools between a first machine and another machine 2 from a different manufacturer, the cassette 7 is placed in an intermediate cassette, known as adaptive cassette 20. The interior of this adaptive cassette 20 is designed so as to slidably receive the cassette comprising the foreign cylindrical tools and its exterior is adapted to allow placement in the machine 2 through the corresponding oblong opening 6. To this end, the adaptive cassette 20 consists of two pairs of brackets 21 kept together at their base by a crossbeam 22. A pin 23 is arranged in the upper-median part of each bracket and constitutes, at its base, one of the four support points which allow to carry the whole converting device 1 in the frame of the machine 2.

The higher part of the adaptive cassette 20 is closed by a lid 25 crossed in its corners by four tightening screws 26 and in its end, along its median part, by two threaded holes 27. The tightening screws 26 vertically extend through each higher part of the brackets 21, whereas the two threaded holes 27 are crossed by two fastening screws (not shown) which are tightened against the tablets 17 of the pair of bearing blocks 12, thus maintaining the cassette 7 in its adaptive cassette 20.

Figure 4:
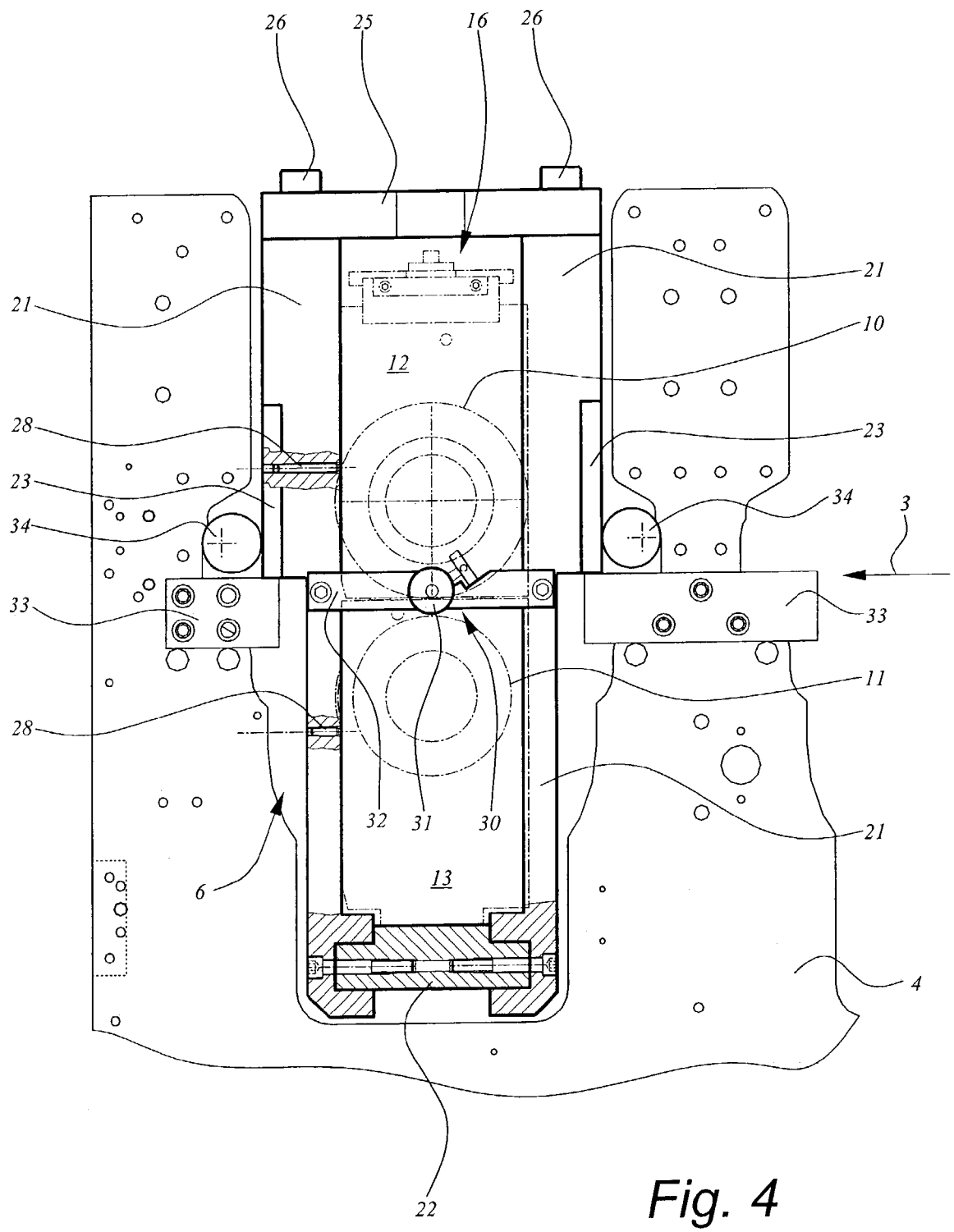
FIG. 4 illustrate a detail of FIG. 1.

FIG. 4 is a detail of FIG. 1 showing the arrangement of the adaptive cassette 20 in the side wall 4 as well as the positioning and blocking means used to maintain the cassette 7 in its adaptive cassette 20 and the latter in the frame of machine 2. The cassette 7 is shown here in dot-and-dash line. The pairs of bearing blocks 12, 13 of the cassette 20 are positioned longitudinally in the direction of arrow 3 against the upstream brackets 21 and maintained in this position by simple members such as two pairs of screws 28 horizontally extending through the downstream brackets 21. A positioning device 30, consisting of an adjusting screw stop 31 for example, allows to block the cassette 7 in the transverse direction so that the gears 14, 15 can correctly be driven. This positioning device 30 is mounted on a clamp 32 connecting the two frontal brackets 21 in their median part.

The whole adaptive cassette 20 is supported by the pins 23 which rest on supports 33, rigidly fixed against the side walls 4, 5 of the frame of the machine 2, so that the bottom of the adaptive cassette 20 does not rest on the bottom of the oblong opening 6 provided in the wall of the frame. The centering and adjustment of the adaptive cassette 20 in its oblong opening 6 is achieved owing to simple members such as eccentric rollers 34 placed on both sides of the pairs of brackets 21. Advantageously, the adaptive cassette is vertically kept in place by its own weight. However, it is also possible to add an additional fastening device if desired.

The driving device 40 is illustrated in FIGS. 2 and 3. It is slidably mounted along a vertical column 41 which is rigidly fixed on the higher part of the lid 25. The driving device 40 comprises a motor 42 whose shaft is connected by a coupling or a clutch (not shown) to a first toothed wheel hidden under the casing 43, which engages a second toothed wheel hidden under the casing 44. The unit consisting of the motor, the coupling and the toothed wheels of transmission, slides vertically along two linear members consisting here of rails 45, fixedly attached to the column 41, along which two guiding blocks 46 fixed to the casing 43 move. A flywheel 47 actuates a turning screw 48 and allows to vertically move the driving device 40 which, placed at the right height, can be blocked by means of a blocking lever 49 for example. Owing to this vertical displacement, the second or last toothed wheel of the driving device 40 can easily be positioned so as to engage the toothed wheel 14 of the upper cutting tool 10 thus transmitting the mechanical force of the motor 42. The engagement of said toothed wheels being protected by a casing 50.

In this embodiment, the converting device 1 collects in one block the cassette 7 including the tools 10, 11, the adaptive cassette 20 and the driving device 40 fixedly attached to the adaptive cassette 20 but vertically movable along a certain distance. Therefore, all the adjustments necessary for the drive of the cylindrical tools and their positioning with respect to the passage plane of the processed matter can advantageously be done outside the machine. The converting device 1 is operative directly after being inserted in the machine 2 and its few parts are easily assembled. Moreover, due to its arrangement, the driving device 40 is immediately adaptable to a broad range of diameters of toothed wheels 14, 15 without having to vertically adjust the adaptive cassette which is always correctly placed with respect to the level of passage of the web matter to be processed.

The described converting device is perfectly designed for a cutting station but is also adaptable to other operations also using similar rotary tools, such as embossing, creasing or printing for example. Obviously, the device of the present invention can also be employed simultaneously in greater number to successively carry out these various operations. In this case, all the motors of the driving devices 40, for example, would be interconnected by means of an electric shaft to ensure their perfect synchronization.

Numerous improvements can be made to the device of this invention within the scope of the claims.

The invention claimed is:

1. A device for rotary conversion of a web or sheet material in a processing machine, wherein the device comprises:
 a tool cassette comprising a supporting first frame, a pair of cooperating cylindrical tools supported in the first frame and the cylindrical tools being operable to convert the web or sheet material;
 an adaptive cassette receiver comprising a second frame configured for being removably received in an opening in said processing machine;
 a driving device including a motor for rotating the cylindrical tools;
 the first frame being removably disposed in the second frame and the cylindrical tools in the first frame being attached via the second frame to the driving device for rotating the cylindrical tools.

2. The device of claim 1, wherein the adaptive cassette receiver has an internal profile shaped to position and fix the tool cassette and the tool cassette has a profile for being received in the internal profile of the adaptive cassette receiver to fix the tool cassette in the adaptive cassette receiver;
 the adaptive cassette receiver having an external profile to position and fix the adaptive cassette receiver in the processing machine.

3. The device of claim 2, wherein the driving device is disposed on the adaptive cassette receiver and in driving contact with the cylinders.

4. The device of claim 2, further comprising:
 a positioning device in the adaptive cassette receiver for positioning the tool cassette against movement with respect to the adaptive cassette receiver and at a position for being engaged by the driving device, whereby the driving device may drive the tools.

5. The device of claim 4, wherein the driving device is disposed on the adaptive cassette receiver and is in driving contact with the cylinders.

6. The device of claim 2, wherein the adaptive cassette receiver comprises upstanding brackets spaced apart and being shaped to together define the internal profile for receiving the tool cassette;
 the upstanding brackets having a bottom region below the tool cassette, a crossbeam joining the brackets at the bottom region;
 a lid of the adaptive cassette receiver disposed over the tool cassette and the lid being attached to the tool brackets for holding the adaptive cassette in the cassette receiver.

7. The device of claim 6, further comprising a column on the lid of the adaptive cassette receiver and the driving device being moveable along the column for positioning with respect to the tool cassette.

8. The device of claim 7, wherein the tool cassette is engaged with the driving device by vertical displacement of the driving device along the column.

9. The device of claim 1, wherein the driving device is disposed on the adaptive cassette receiver and in driving contact with the cylinders.

10. Device for rotary conversion of a web or sheet material in at least one processing station arranged in a machine, comprising:
 a tool cassette comprising a first frame holding a pair of cylindrical tools for being rotated by a driving device equipped with a motor;
 said tool cassette being removably accommodated in an adaptive cassette receiver, said adaptive cassette receiver comprising a second frame and being configured for being removably received and held in an opening in said processing station;
 said driving device being arranged on the adaptive cassette receiver and drivingly connected to said tools.

11. Device according to claim 10, wherein the adaptive cassette receiver has an internal profile designed so as to position and fix the tool cassette therein, and an external profile designed so as to position and fix the adaptive cassette receiver in the processing machine.

12. Device according to claim 11, wherein the adaptive cassette receiver is equipped with a positioning device for blocking the tool cassette in a position for allowing the driving device to drive the cylindrical tools.

13. Device according to claim 12, wherein the adaptive cassette receiver is formed by two pairs of brackets secured to a crossbeam fixed at their base and by a lid fixed at their upper end.

14. Device according to claim 13, wherein the driving device is vertically movable along a column fixed to the lid.

15. Device according to claim 14, wherein driving engagement with the cylindrical tools is achieved by vertical displacement of the driving device.

* * * * *